United States Patent [19]

Staiger

[11] Patent Number: 4,500,231

[45] Date of Patent: Feb. 19, 1985

[54] VALVE FOR CONTROLLING SOLIDS FLOW

[75] Inventor: M. Daniel Staiger, Idaho Falls, Id.

[73] Assignee: The United States of America as represented by the United States Department of Energy, Washington, D.C.

[21] Appl. No.: 426,446

[22] Filed: Sep. 29, 1982

[51] Int. Cl.³ .............................................. B65G 53/40
[52] U.S. Cl. .................................... 406/198; 406/108; 406/136
[58] Field of Search ............... 406/192, 198, 136, 137, 406/108, 138; 193/32; 222/397, 399, 637

[56] References Cited

U.S. PATENT DOCUMENTS

| | | | |
|---|---|---|---|
| 2,726,136 | 12/1955 | Davis, Jr. ........................ | 406/136 X |
| 3,261,379 | 7/1966 | Stockel et al. | |
| 3,297,369 | 1/1967 | Vandenhoeck | |
| 4,203,689 | 5/1980 | Kraxner et al. ................. | 406/138 X |

OTHER PUBLICATIONS

Proceedings of the 6th International Conference on Fluidized Bed Combustion, Apr. 9-11, 1980, CONF—800428—vol. 3, p. 980.
Robert H. Perry, et al., Editors, Chemical Engineer's Handbook, 4th Edition, McGraw-Hill, 1963, pp. 20-46 to 20-49.

Primary Examiner—Jeffrey V. Nase
Assistant Examiner—Daniel R. Edelbrock
Attorney, Agent, or Firm—Jeannette M. Walder; Paul A. Gottlieb

[57] ABSTRACT

A valve for controlling the flow of solids comprises a vessel having an overflow point, an inlet line for discharging solids into the vessel positioned within the vessel such that the inlet line's discharge point is lower than the vessel's overflow point, and apparatus for introducing a fluidizing fluid into the vessel. The fluidizing fluid fluidizes the solids within the vessel so that they overflow at the vessel's overflow point. For the removal of nuclear waste product the vessel may be placed within a sealed container having a bottom connected transport line for transporting the solids to storage or other sites. The rate of solids flow is controlled by the flow rate of the fluidizing fluid and by V-notch weirs of different sizes spaced about the top of the vessel.

5 Claims, 6 Drawing Figures

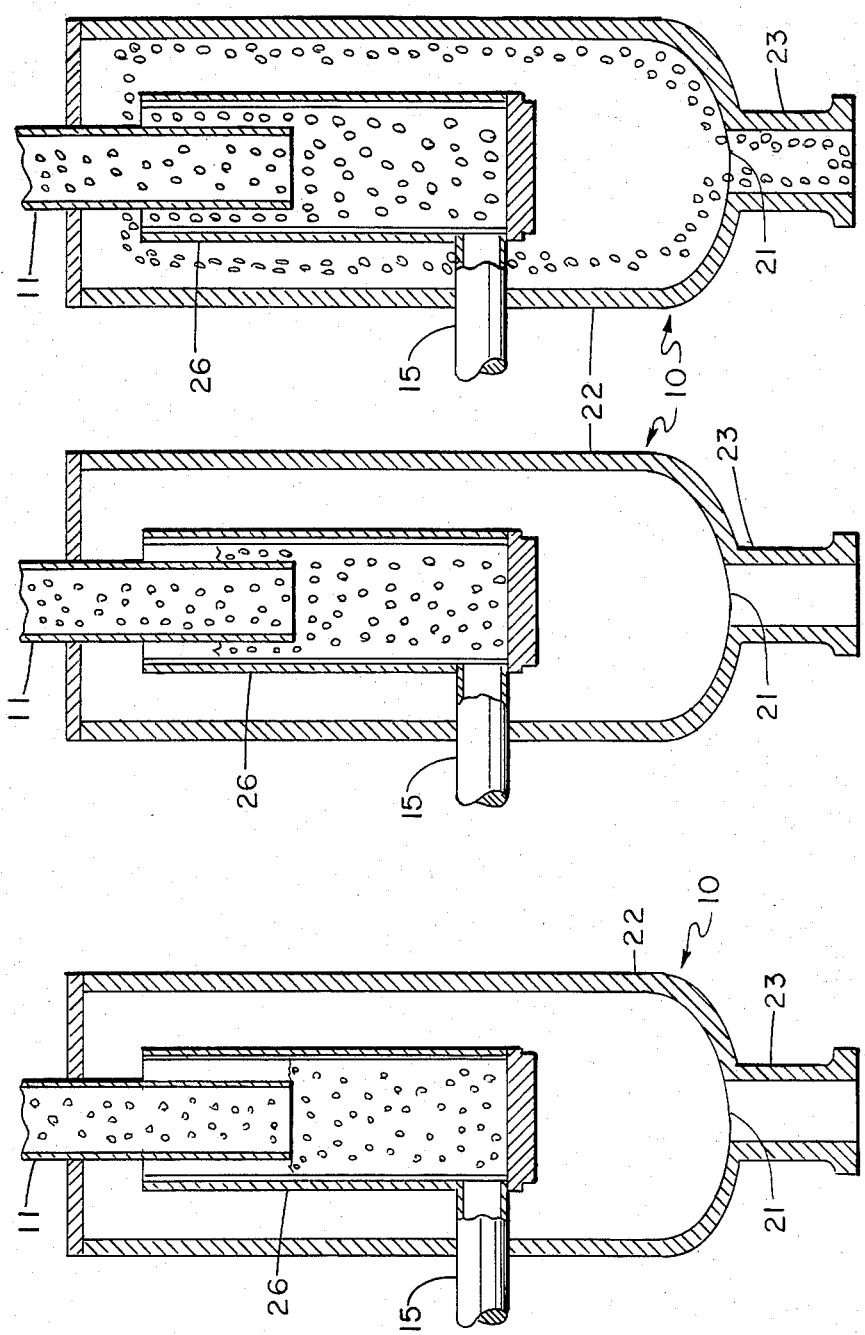

VALVE FOR CONTROLLING SOLIDS FLOW

CONTRACTUAL ORIGIN OF THE INVENTION

The U.S. Government has rights in this invention pursuant to Contract No. DE-AC07-79ID01675 between the U.S Department of Energy and Exxon Nuclear Idaho Company, Inc.

BACKGROUND OF THE INVENTION

This invention relates to a valve for controlling the flow of solids and, more particularly, to a valve for controlling the removal of nuclear waste product.

There are many problems associated with controlling the flow of bulk solids. Flow conditions must take into account safety precautions, particle size variations, and the tendency of the particles to form agglomerates and clinkers. Industries such as grain and fertilizer use various systems involving conveyors and pumps to control the flow of their products. Such systems are entirely unacceptable for the removal of nuclear waste product. Nuclear waste product is typically produced from a high-temperature environment (550° C.) over a relatively high pressure differential (20 inches water column). Also, nuclear waste product comes in a wide particle size distribution and is often subject to the formation of small clinkers and agglomerates. Such hazardous conditions mandate a safe, sealed, controllable removal system.

Frequently, nuclear waste product is removed from a fluidized bed. Non-nuclear fluidized bed applications typically control solids discharge with various mechanical valves. Mechanical valves are subject to frequent destruction when used with nuclear waste product.

Cyclone solids return seals apply various overflow type discharge valves. These valves are designed to treat the solids as a fluid and to discharge the solids as quickly as possible. The consistency of nuclear waste product is quite different from the solids flowing through cyclones. As stated earlier, there is great tendency to form agglomerates and clinkers which inhibits the flowability of the waste product. Furthermore, due to the radioactive nature of the product, its flow must be carefully controlled and metered.

Previous systems for controlling nuclear waste product removal involved the use of a product removal nozzle. This nozzle consists of a small diameter high velocity horizontal section (pipe) followed by a larger diameter horizontal deceleration section, which decelerates the solids to reduce erosion before they hit a blinded tee bend at the end of the section. A small diameter bar was welded across the nozzle inlet to prevent entry of lumps that might plug the nozzle. Dilution air was introduced near the nozzle entry to prevent plugging in the inlet section. This particular system was susceptible to frequent downtime as a result of plugging due to clinkers and agglomerates.

Therefore, it is an object of this invention to provide a valve for controlling the flow of solids.

It is another object of this invention to provide a safe, reliable device for metering the removal of nuclear waste product.

It is also an object of this invention to provide a valve for controlling the removal of solids that is operable in extreme temperature and pressure conditions.

It is a further object of this invention to provide a valve for controlling the removal of a nuclear waste product that is not susceptible to plugging by clinkers and agglomerates and that will remove product containing a wide particle size distribution.

Additional objects, advantages and novel features of the invention will be set forth in part of the description which follows, and in part will become apparent to those skilled in the art upon examination of the following or may be learned by practice of the invention.

SUMMARY OF THE INVENTION

To achieve the foregoing and other objects of the present invention, the valve for controlling the flow of solids may comprise a vessel having an overflow point, an inlet line for discharging solids into the vessel positioned within the vessel such that the inlet line's discharge point is lower than the vessel's overflow point, and a means for introducing a fluidized fluid (usually air) into the vessel. The fluidizing fluid acts to fluidize the solids within the vessel so that they overflow at the vessel's overflow point. Solids overflowing the vessel are collected in a container having a bottom connected transport line (usually a pipe), directed through a funnel, or fall directly onto a transport means. When the flow rate of the fluidizing fluid is controlled, the rate at which solids are removed from the vessel is also controlled. V-notch weirs spaced about the top of the vessel aid in metering the flow.

The valve as described starts, stops and controls the flow of solids without plugging by clinkers and agglomerates.

Nuclear waste product removal requires the valve be sealed or closed. This is accomplished by placing the vessel within a sealed container having a bottom connected transport line for transporting the solids to storage or other sites. The container would have suitable openings for receiving, positioning, and sealing the inlet, fluidizing and transport lines.

BRIEF DESCRIPTION OF THE DRAWINGS

The present invention is illustrated in the accompanying drawings wherein:

FIG. 4, A through C, shows the operation of valve 10.

DETAILED DESCRIPTION OF THE PREFERRED EMBODIMENT

Figure 1:
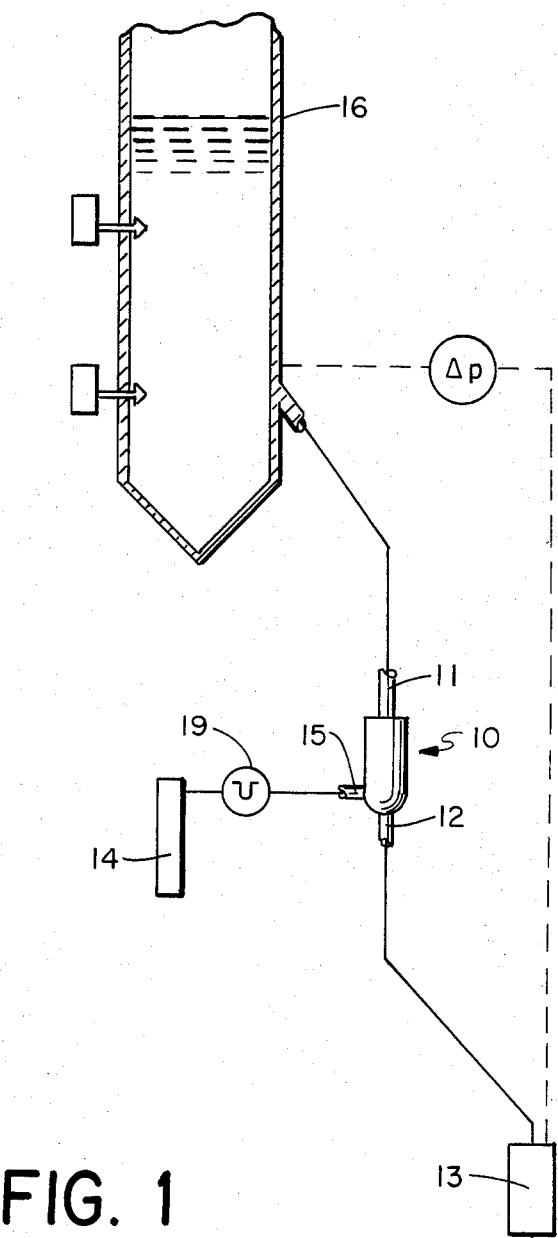
FIG. 1 is a schematic diagram of a waste product removal system incorporating a valve for controlling solids flow, as used in a nuclear environment.

Referring to FIG. 1 showing a typical waste product removal system, solids drain by gravity from fluidized bed 16 in a production area, which may be a calciner, through inlet line 11 into valve 10 until the solids flow stops. To get solids to flow through valve 10 and out line 12, air (or some other fluidizing fluid) from supply 14 is introduced through line 15 connected into valve 10. Air fluidizes the solids within valve 10, causing them to discharge through transport line 12 into basin 13. The rate of air introduction is controlled by air valve 19 and controls the rate of solids discharge.

Figure 2:
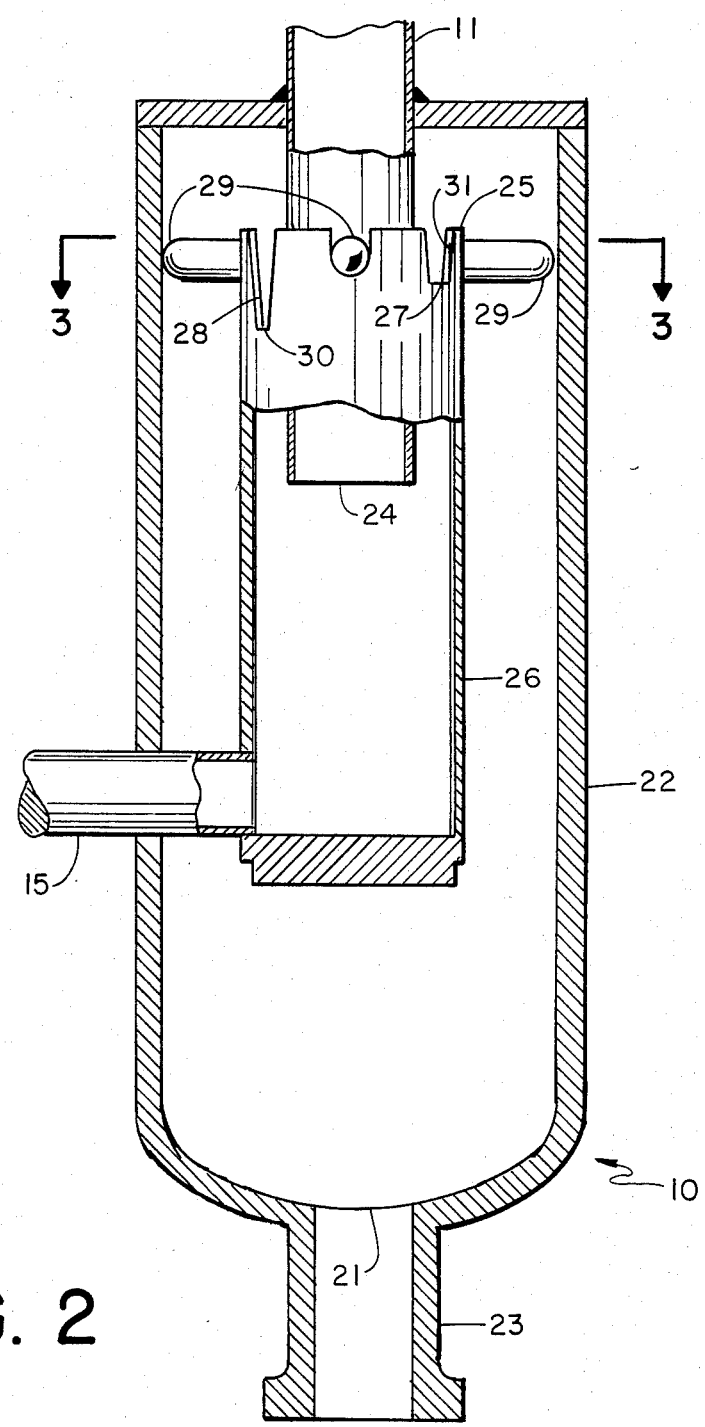
FIG. 2 is a cross-sectional view of a preferred embodiment of the valve 10 of FIG. 1.
Figure 3:
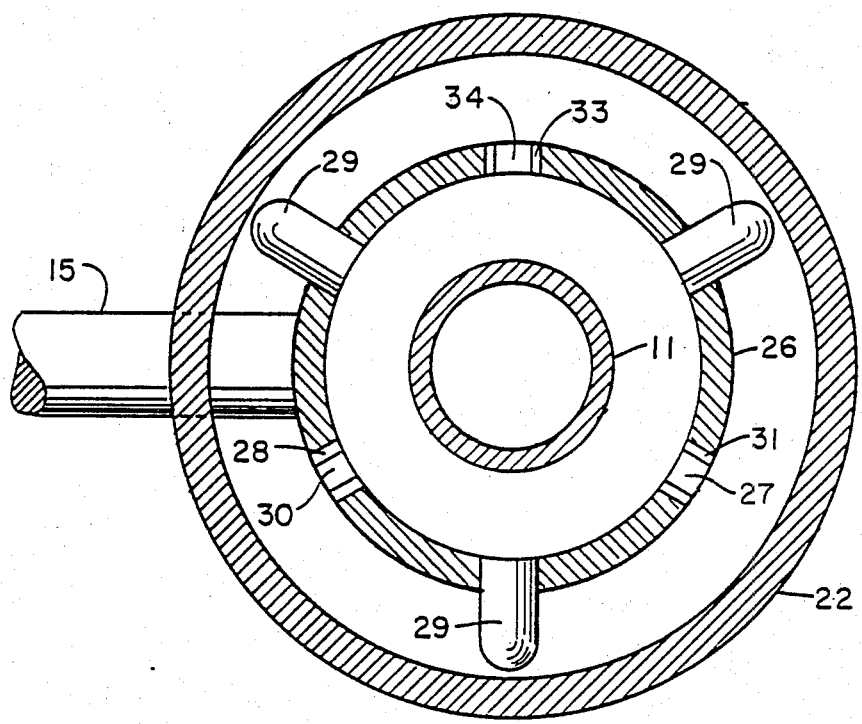
FIG. 3 is a cross-sectional view taken along line 3—3 of FIG. 2.

In FIGS. 2 and 3 inlet line 11 is positioned within vessel 26 of valve 10 such that its discharge point 24 is lower than overflow points 27, 30 and 34 of vessel 26. Vessel 26 is positioned within container 22 such that air line 15 fits through the wall of container 22 and connects into and positions vessel 26 within container 22. V-notch weirs 28, 31 and 33, having overflow points 30, 27 and 34 respectively, are equally spced at the top of vessel 26 to aid in the control of the rate of overflow of solids. Rods 29 are located at the top of vessel 26 to aid in centering vessel 26 within container 22. Solids overflowing vessel 26 into container 22 pass through opening 21 in bottom connection 23 connected to transport line 12 (shown in FIG. 1).

Solids discharge from inlet line 11 until vessel 26 fills sufficiently to cover inlet line discharge point 24, forming a solids bed at which time flow stops as shown in FIG. 4A. In order to cause solids to flow "through" valve 10, a fluidizing fluid such as air is introduced from line 15 into vessel 26 fluidizing the solids bed therein causing it to expand so that more solids from inlet line 11 enter vessel 26 as shown in FIG. 4B. As long as air is introduced at a sufficient rate into vessel 26 the solids bed continues to expand until solids overflow the top of vessel 26 into container 22 and out through opening 21 in bottom connection 23 (as shown in FIG. 4C).

The rate at which solids overflow is controlled by and related to the rate of air introduction. Further control or metering of the flow is achieved by the use of V-notch weirs with varying depth as shown in FIG. 2. After air is introduced into vessel 26, the solids bed expands until solids overflow at point 30, the lowest overflow point. Increasing the rate at which air is introduced into vessel 26 causes the bed to expand further until solids overflow at points 30 and 27, the next lowest overflow point. Still increasing the rate at which air is introduced into vessel 26 causes solids to overflow at all three overflow points, 30, 27 and 34. Turning off the air supply causes the solids bed to collapse below point 30 and overflow to cease. Thus, the rate at which solids flow through the valve is determined by the rate (volume of solids and speed of flow) at which air is introduced and controlled by the number of overflow points.

EXAMPLE

The system, as shown in FIG. 1 was tested using a 30 cm calciner (16) to produce Zr/Na blend calcine waste product. Product removal was accomplished by increasing the fluidizing air rate to the product removal valve (10) while maintaining the pressure differential $\Delta p$ (see FIG. 1) across the system at approximately 20 inches of water. Three seven-hour runs were performed. Results indicated that continuous product removal of Zr/Na blend calcine can be achieved and that bed removal rates are controllable in the range of 50 to 300 Kg/hr with no plugging or choking.

The foregoing description of a preferred embodiment of the invention has been presented for purposes of illustration and description. It is not intended to be exhaustive or to limit the invention to the precise form disclosed, and obviously many modifications and variations are possible in light of the above teachings.

The embodiments of this invention in which an exclusive property or privilege is claimed are defined as follows:

1. A valve for controlling the flow of solids into a transport means comprising:
   a container having a bottom located opening for receiving said transport means and having a top located opening therethrough;
   a vessel for receiving solids positioned within said container and having a top overflow, said vessel including a plurality of V-notch weirs spaced about said top overflow, said V-notch weirs having unequal depth;
   an inlet line, positioned within said vessel and sealingly positioned through said top located opening, for discharging the solids into said vessel, said inlet line having a discharge point lower than said top overflow;
   a fluid line sealingly connected into said vessel for introducing a fluidizing fluid into said vessel to fluidize the solids therein sufficiently to cause solids to overflow said top overflow;
   means for controlling the flow of fluidizing fluid through said fluid line such that the flow of solids is controlled at a rate determined by the flow of said fluidizing fluids.

2. A valve as recited in claim 1 wherein said fluidizing fluid is air.

3. The valve of claim 1 further comprising means for positioning said vessel within said container to aid the overflow of solids.

4. The valve of claim 3 wherein said positioning means comprises a plurality of rods spaced about the top of said vessel.

5. A valve for controlling the flow of solids into a transport means comprising:
   a container having a bottom located opening for receiving said transport means and having a top located opening therethrough;
   a vessel for receiving solids within said container and having a top overflow, said vessel including three V-notch weirs equally spaced about said top overflow, said V-notch weirs having unequal depth;
   an inlet line, positioned within said vessel and sealingly positioned through said top located opening, for discharging the solids into said vessel, said inlet line having a discharge point lower than said top overflow,
   a fluid line sealingly connected into said vessel for introducing a fluidizing fluid into said vessel to fluidize the solids therein sufficiently to cause solids to overflow said top overflow; and
   means for controlling the flow of fluidizing fluid through said fluid line such that the flow of solids is controlled at a rate determined by the flow of said fluidizing fluids.

* * * * *